United States Patent
Guen

(10) Patent No.: US 9,012,065 B2
(45) Date of Patent: Apr. 21, 2015

(54) SECONDARY BATTERY AND BATTERY PACK HAVING THE SAME

(75) Inventor: Minhyung Guen, Yongin-si (KR)

(73) Assignees: Samsung SDI Co., Ltd., Yongin-si (KR); Robert Bosch GmbH, Stuttgart (DE)

( * ) Notice: Subject to any disclaimer, the term of this patent is extended or adjusted under 35 U.S.C. 154(b) by 0 days.

(21) Appl. No.: 13/206,288

(22) Filed: Aug. 9, 2011

(65) Prior Publication Data

US 2012/0231305 A1 Sep. 13, 2012

(30) Foreign Application Priority Data

Mar. 10, 2011 (KR) .................. 10-2011-0021343

(51) Int. Cl.
| | |
|---|---|
| *H01M 2/00* | (2006.01) |
| *H01M 2/02* | (2006.01) |
| *H01M 2/04* | (2006.01) |
| *H01M 2/10* | (2006.01) |
| *H01M 2/30* | (2006.01) |
| *H01M 2/36* | (2006.01) |
| *H01M 2/12* | (2006.01) |

(52) U.S. Cl.
CPC ............ *H01M 2/0237* (2013.01); *H01M 2/043* (2013.01); *H01M 2/1077* (2013.01); *H01M 2/12* (2013.01); *H01M 2/305* (2013.01); *H01M 2/362* (2013.01)

(58) Field of Classification Search
USPC ......... 429/159, 163, 161, 179, 180, 181, 178, 429/183
See application file for complete search history.

(56) References Cited

U.S. PATENT DOCUMENTS

| | | | | |
|---|---|---|---|---|
| 4,100,332 | A * | 7/1978 | Carr .............................. | 429/210 |
| 2005/0158621 | A1 | 7/2005 | Benoit et al. | |
| 2005/0174092 | A1 | 8/2005 | Dougherty et al. | |
| 2007/0231684 | A1* | 10/2007 | Takano et al. ................. | 429/161 |
| 2007/0232123 | A1* | 10/2007 | Uh ................................ | 439/404 |
| 2009/0186269 | A1* | 7/2009 | Kim et al. ..................... | 429/179 |
| 2010/0178547 | A1* | 7/2010 | Li ................................. | 429/151 |
| 2010/0196745 | A1 | 8/2010 | Ahn et al. | |
| 2010/0266894 | A1 | 10/2010 | Byun et al. | |

FOREIGN PATENT DOCUMENTS

| | | |
|---|---|---|
| DE | 10-2009-015727 A1 | 10/2010 |
| EP | 2 207 221 A1 | 7/2010 |
| GB | 361376 | 8/1930 |
| JP | 2001-256961 A | 9/2001 |
| KR | 10-2005-0106541 A | 11/2005 |
| KR | 10-2006-0111844 A | 10/2006 |
| KR | 10-2008-0020000 A | 3/2008 |
| KR | 2010-0115983 | 10/2010 |
| KR | 10-1042766 B1 | 6/2011 |

OTHER PUBLICATIONS

DE 102009015727 M. Translation.*

(Continued)

*Primary Examiner* — Patrick Ryan
*Assistant Examiner* — Alex Usyatinsky
(74) *Attorney, Agent, or Firm* — Christie, Parker & Hale, LLP

(57) ABSTRACT

A secondary battery including a case having an opening; an electrode assembly housed in the case; at least one current collector coupled to an uncoated portion of the electrode assembly and forming an electrode terminal, wherein the case has a coupling groove recessed toward the at least one current collector; and a cap plate coupled to seal the opening of the case.

17 Claims, 5 Drawing Sheets

(56) References Cited

OTHER PUBLICATIONS

Machine English Translation of JP 2001-256961 A.
European Search Report, dated Jun. 28, 2012 for European Patent Application No. 11188281.7, 6 pages.
KIPO Notice of Allowance dated Apr. 29, 2013, for Korean priority Patent application 10-2011-0021343, (5 pages).
Espacenet English Abstract for Korean Publication 2010-0090141, dated Aug. 13, 2010, corresponding to Korean Patent 10-1042766, dated Jun. 20, 2011, listed above, (2 pages).

* cited by examiner

SECONDARY BATTERY AND BATTERY PACK HAVING THE SAME

CROSS-REFERENCE TO RELATED APPLICATION

This application claims priority to and the benefit of Korean Patent Application No. 10-2011-0021343, filed on Mar. 10, 2011, the entire content of which is incorporated herein by reference.

BACKGROUND

1. Field

Embodiments of the present invention relate to a secondary battery and a battery pack including the same.

2. Description of the Related Art

Unlike a primary battery, a secondary battery can be recharged. Lower power batteries are used for various advanced electronic devices such as cellular phones, laptop computers, and camcorders. Bulk size batteries are used as the power source for motor drive, such as in hybrid electric vehicles.

A secondary battery generally includes an electrolyte. In order to secure reliability of the secondary battery, an electrolyte contained in a case is prevented from leaking.

In addition, when a secondary battery is used as a bulk-sized power source for an electric vehicle or a hybrid vehicle, a battery pack having a large number of secondary batteries is typically used in order to offer sufficient an output or capacity, increasing the manufacturing cost of the battery pack. Accordingly, it is desirable to minimize the manufacturing cost.

SUMMARY

Embodiments of the present invention provide a secondary battery which can minimize an assembly time, can save material costs, can prevent an electrolyte from leaking and can reduce current leakage, and also provides a battery pack having the secondary battery.

According to an embodiment of the present invention, a secondary battery is provided including a case having an opening; an electrode assembly housed in the case; at least one current collector coupled to an uncoated portion of the electrode assembly and forming an electrode terminal, wherein the case has a coupling groove recessed toward the at least one current collector; and a cap plate coupled to seal the opening of the case.

In one embodiment, the second battery includes an additional current collector and an additional coupling groove recessed toward the additional current collector.

The coupling groove of the case may be formed to correspond to a positive electrode current collector of the one or more current collectors.

The case may contact the positive electrode current collector through the coupling groove.

In addition, the case may be connected to the positive electrode current collector by welding.

The coupling groove of the case may be formed to correspond to a negative electrode current collector of the one or more current collectors.

In addition, the coupling groove of the case may be coupled to the negative electrode current collector through an insulation member formed between the case and an electrode terminal of the negative electrode current collector.

A through-hole may be formed in the coupling groove of the case to allow the electrode terminal of the negative electrode current collector to pass therethrough.

The electrode terminal of the negative electrode current collector may be engaged with a nut coupled thereto from the outside of the case.

An insulation member may further be formed between the case and the nut.

The case may further include at least one inwardly recessed auxiliary groove.

The cap plate may further include a safety vent formed on a surface opposite to the surface having the opening, the safety vent having a relatively small thickness compared to other regions.

According to another embodiment of the present invention, a battery pack is provided including a plurality of secondary batteries each comprising a case having an opening, an electrode assembly housed in the case and forming an electrode terminal, a pair of current collectors coupled to an uncoated portion of the electrode assembly, and a cap plate sealing the opening of the case, wherein the case has a coupling groove that is inwardly recessed toward at least one of the pair of current collectors; and a pack case having a coupling protrusion generally corresponding to the coupling groove of each of the secondary batteries to be coupled to a respective one of the secondary batteries.

The coupling protrusion may be electrically connected to the current collector through the coupling groove of each of the secondary batteries.

In addition, each of the secondary batteries may further include at least one auxiliary groove formed in the case, and the pack case may further include an auxiliary protrusion corresponding to the auxiliary groove.

The current collector of each of the secondary batteries may further include a positive electrode current collector and a negative electrode current collector, and the case is coupled to the positive electrode current collector by welding.

In addition, the negative electrode current collector may have an electrode terminal exposed to the outside of the case through an insulation member, and a nut is engaged with the electrode terminal.

In the secondary battery and the battery pack having the same, since the battery pack can be assembled by coupling a coupling hole of a case to a coupling protrusion of a lower pack case, a separate structure, e.g., a bus bar, is not necessary, thereby reducing the manufacturing cost.

In manufacturing the battery pack, the secondary battery and a lower pack case can be assembled to each other due to a weight of the secondary battery. Thus, since a separate welding process is not necessary and a separate pressing structure is not necessary, the manufacturing time can be shortened.

In addition, since the case and the lower pack case are assembled to each other due to the weight of the secondary battery, a separate pressing process is not necessary, thereby minimizing deformation of the assembled structure and reducing electrolyte leakage and current leakage.

Additional aspects and/or advantages of the invention will be set forth in part in the description which follows and, in part, will be obvious from the description, or may be learned by practice of the invention.

BRIEF DESCRIPTION OF THE DRAWINGS

The objects, features and advantages of the present invention will be more apparent from the following detailed description in conjunction with the accompanying drawings, in which.

DETAILED DESCRIPTION

Hereinafter, embodiments of the present invention will be described in detail with reference to the accompanying drawings such that they can easily be made and used by those skilled in the art.

A construction of a secondary battery according to an embodiment of the present invention will now be described.

Figure 1:
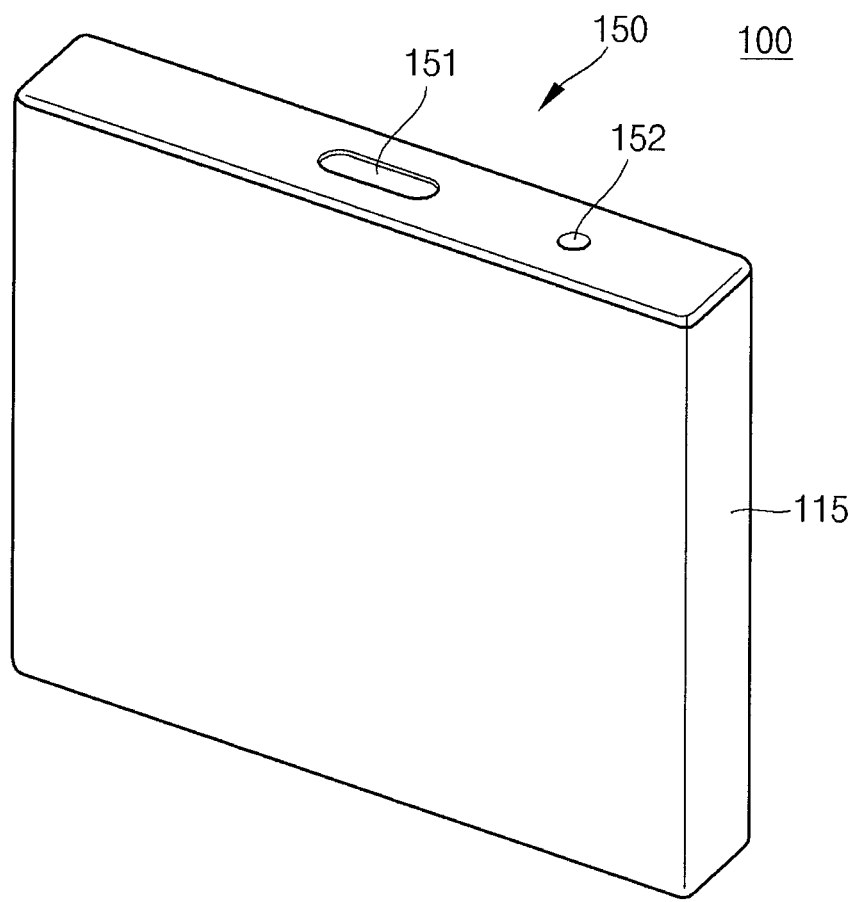
FIG. 1 is a perspective view illustrating a secondary battery according to an embodiment of the present invention.
Figure 2:
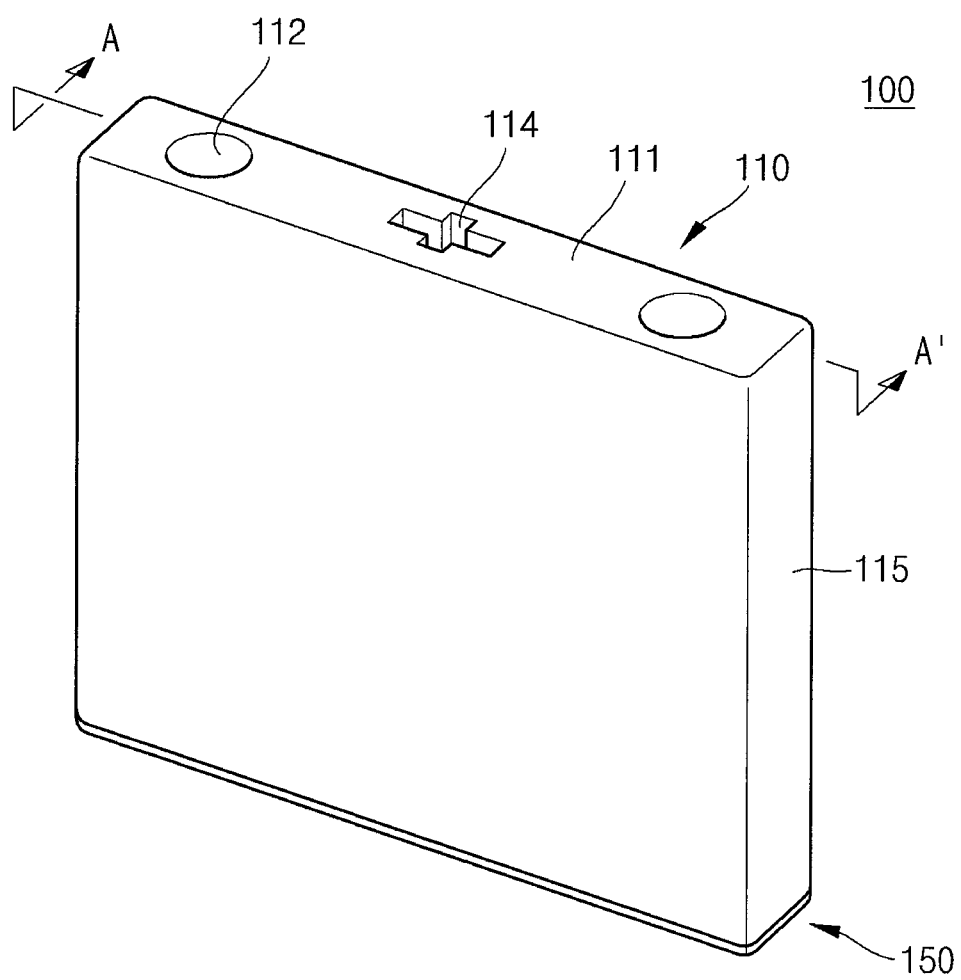
FIG. 2 is a perspective view illustrating a rear surface of the secondary battery shown in FIG. 1.
Figure 3:
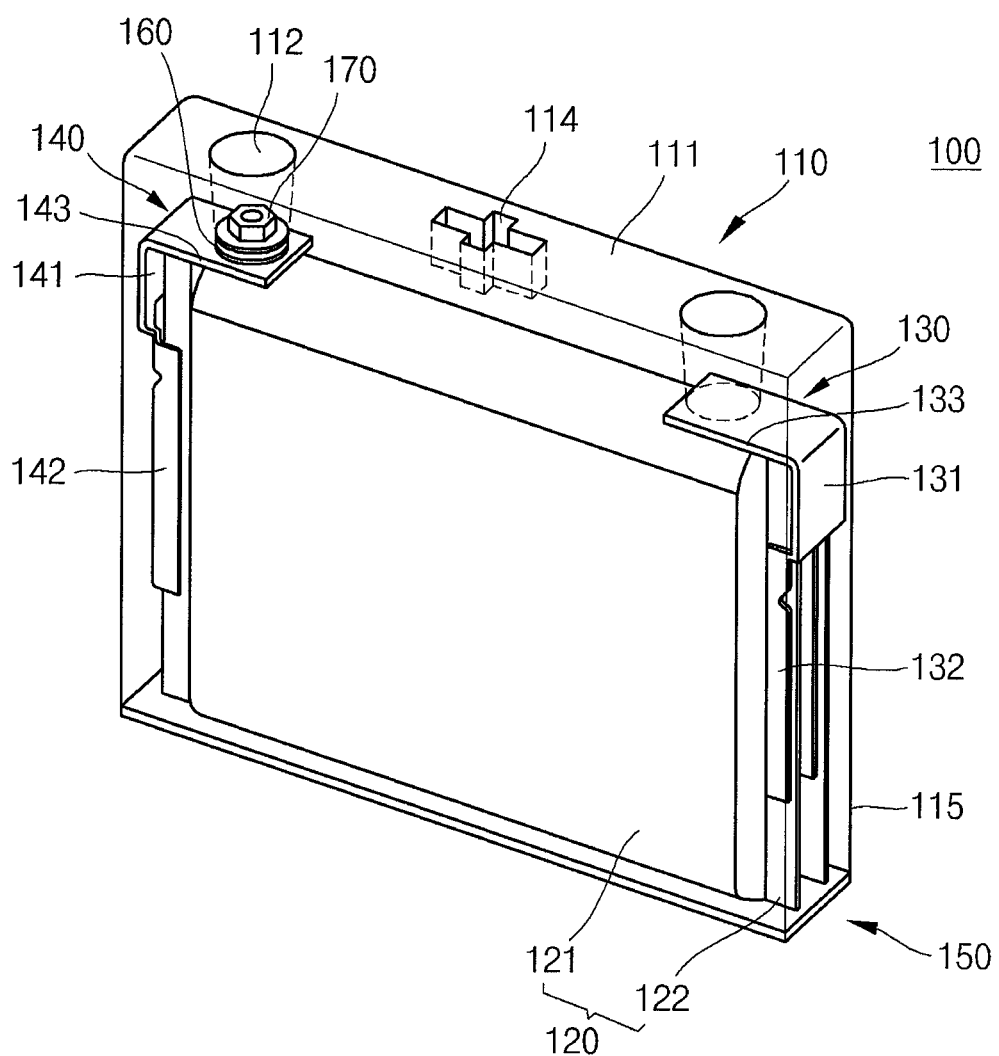
FIG. 3 is a cut-away view of FIG. 2.
Figure 4:
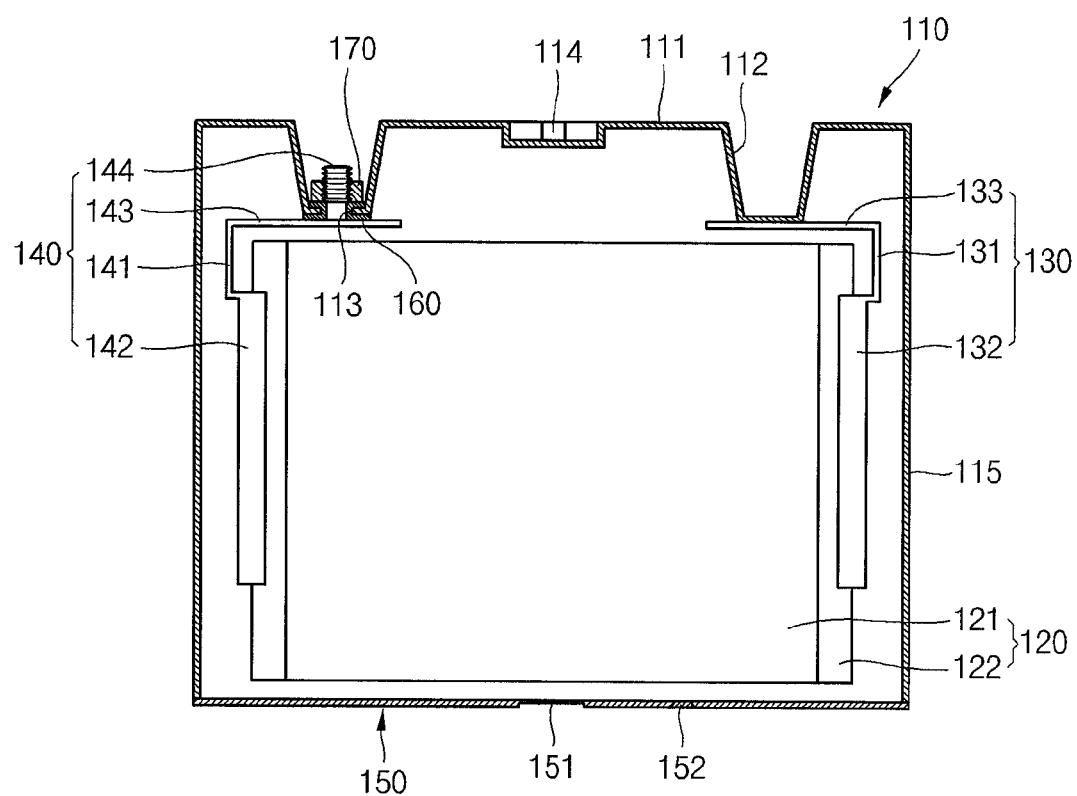
FIG. 4 is a cross-sectional view taken along the line A-A' of FIG. 2.

FIG. 1 is a perspective view illustrating a secondary battery according to an embodiment of the present invention, FIG. 2 is a perspective view illustrating a rear surface of the secondary battery shown in FIG. 1, FIG. 3 is a cut away view of FIG. 2, and FIG. 4 is a cross-sectional view taken along the line A-A' of FIG. 2.

Referring to FIGS. 1 through 4, the secondary battery 100 includes a case 110, an electrode assembly 120, current collectors 130 and 140, a cap plate 150, and a nut 170. An insulation member 160 may further be formed between a negative electrode current collector 140 of the current collectors 130 and 140, and the cap plate 150 and between the cap plate 150 and the nut 170.

The case 110 is formed of a conductive metal such as aluminum, an aluminum alloy or nickel plated steel, and has a substantially hexahedral shape with an opening to receive the electrode assembly 120 and the current collectors 130 and 140.

The case 110 includes a bottom portion 111 located on a bottom when the secondary battery 100 is assembled. In addition, the bottom portion 111 includes inwardly recessed coupling grooves 112 formed at locations corresponding to the current collectors 130 and 140.

The coupling groove 112 is recessed from the bottom portion 111 while tapering toward the current collector 130, 140. The coupling groove 112 is positioned inwardly relative to the bottom portion 111 and contacts the positive electrode current collector 130. In addition, the coupling groove 112 may be connected to the positive electrode current collector 130 by welding. Therefore, the case 110 having the coupling groove 112 may have a positive polarity, forming a positive terminal of the secondary battery 100 according to the embodiment of the present invention.

In addition, the coupling groove 112 is positioned inwardly relative to the bottom portion 111 and includes a through-hole 113 to expose a portion of the negative electrode current collector 140. Thus, the negative electrode current collector 140 is connected to the nut 170 and fixed, forming a negative terminal of the secondary battery 100 according to the embodiment of the present invention. Here, the case 110 having a positive polarity may be assembled through the insulation member 160 between the negative electrode current collector 140 and the nut 170 connected thereto, thereby preventing electrical short-circuit.

Since the coupling groove 112 is inwardly recessed into the case 110, it can be assembled with a pack case having a terminal protruding to be coupled. In one embodiment, the pack case can be coupled to the secondary battery 100 according to the embodiment of the present invention through the protruding terminal even without a separate structure e.g., a bus bar, and therefore, multiple secondary batteries 100 can be easily connected to each other in series or parallel. In addition, while the coupling groove 112 corresponding to a positive electrode of the case 110 is welded, the coupling groove 112 corresponding to a negative electrode of the case 110 includes the nut 170. In other words, the coupling grooves 112 corresponding to the positive and negative electrodes of the case 110 have different shapes. Thus, misassembly of the secondary battery 100 can be easily identified. The case 110 may further include an auxiliary groove 114 formed roughly in the center thereof to facilitate coupling to the pack case. The auxiliary groove 114 allows the case 110 to be tightly fixed at an accurate location of one surface of the pack case. The assembling structure of the secondary battery 100 will later be described.

The electrode assembly 120 is formed by winding or laminating a stack of a positive electrode plate, a negative electrode, which are formed of thin plates or foils, and a separator between the positive and negative electrode plates. In this case, the positive electrode plate is formed by coating a positive electrode active material made of a transition metal oxide on a positive electrode current collector made of a metal foil, for example, an aluminum (Al) foil. The negative electrode plate is formed by coating a negative electrode active material made of graphite or carbon on a negative electrode current collector made of a metal foil, for example, a nickel or copper foil. The separator is positioned between the positive and negative electrode plates and prevents a short circuit while allowing the lithium ions to move. The separator may be made of polyethylene, polypropylene, or a composite film of polyethylene and polypropylene.

In addition, the electrode assembly 120 includes a coated portion 121 that is coated with the positive electrode active material or the negative electrode active material, and an uncoated portion 122 that is not coated with the positive electrode active material or the negative electrode active material. The uncoated portion 122 is generally located at the edge of the coated portion 121 and is connected to the current collector 130, 140, forming a current path.

The current collectors 130 and 140 are connected to the electrode assembly 120. Each of the current collectors 130 and 140 is coupled to the uncoated portion 122 to be electrically connected. The current collectors 130 and 140 include a positive electrode current collector 130 connected to the uncoated portion 122 coupled to the positive electrode plate of the electrode assembly 120, and a negative electrode current collector 140 connected to the uncoated portion 122 coupled to the negative electrode plate of the electrode assembly 120.

The positive electrode current, collector 130 is coupled to the positive electrode plate of the electrode assembly 120 through the uncoated portion 122. The positive electrode current collector 130 may be coupled to the uncoated portion 122 by welding, such as laser welding or resistance welding. In addition, the positive electrode current collector 130 may be generally made of aluminum or an aluminum alloy. The positive electrode current collector 130 includes a first region 131 extending in a direction substantially parallel with the uncoated portion 122, a second region 132 extending from one edge or end of the first region 131 and welded to the uncoated portion 122, and a third region 133 bent approximately 90° to the other end of the second region 132. Here, the third region 133 is formed to contact a surface of the coupling groove 112 of the case 110. In addition, the third region 133 may be connected to the coupling groove 112 of the case 110 by welding. Therefore, the case 110 may have the same polarity as the positive electrode current collector 130, forming a positive electrode.

The negative electrode current collector 140 is coupled to the negative electrode plate of the electrode assembly 120 through the uncoated portion 122. The negative electrode current collector 140 may also be coupled to the uncoated portion 122 by welding, such as laser welding or resistance welding. The negative electrode current collector 140 may be generally made of copper or nickel. The negative electrode current collector 140 includes a first region 141, a second region 142 and a third region 143 generally corresponding to those of the positive electrode current collector 130. The negative electrode current collector 140 may further include a fourth region 144 having a thread formed along its outer circumference. The fourth region 144 passes through the case 110 and is coupled to the nut 170 through the thread. However, since the fourth region 144 of the negative electrode current collector 140 should be electrically insulated from the case 110, the insulation member 160 is further provided between the fourth region 144 and the case 110.

The cap plate 150 is coupled to the case 110 to seal an opening of the case 110. The cap plate 150 is basically formed of a planar plate. In addition, the cap plate 150 is formed to cover a portion of (e.g., an edge of) a lateral surface 115 of the case 110 and assembled by welding along the lateral surface 115. The cap plate 150 may include a safety vent 151 formed roughly in the center of a top surface of the cap plate 150, the safety vent 151 having a relatively small thickness compared to other regions of the cap plate 150. The safety vent 151 is positioned upwardly (i.e., near or at a top edge) in the battery pack. When the internal pressure of the case 110 increases, the safety vent 151 is opened earlier than the other regions to release internal gas, thereby securing the stability against the internal pressure of the case 110.

The cap plate 150 may further include an electrolyte injection hole 152 for injecting an electrolyte into the case 110. However, in a case where the cap plate 150 is assembled with the case 110 after the electrolyte is injected into the case 110, the electrolyte injection hole 152 may not be formed.

The insulation member 160 is formed between the negative electrode current collector 140 of the current collectors 130 and 140 and the case 110. The insulation member 160 is also formed between the case 110 and the nut 170. The insulation members 160 electrically insulate the case 110 from the negative electrode current collector 140 and the nut 170.

The nut 170 is coupled to the negative electrode current collector 140 on the insulation member 160. The nut 170 is engaged with the negative electrode current collector 140 through a thread formed therein, so that a position of the negative electrode current collector 140 is fixed. In addition, since the nut 170 is coupled only to the negative electrode current collector 140, the negative electrode current collector 140 can be easily differentiated from the positive electrode current collector electrode assembly 130.

Hereinafter, a construction of a battery pack including secondary batteries according to an embodiment of the present invention will be described.

Figure 5:
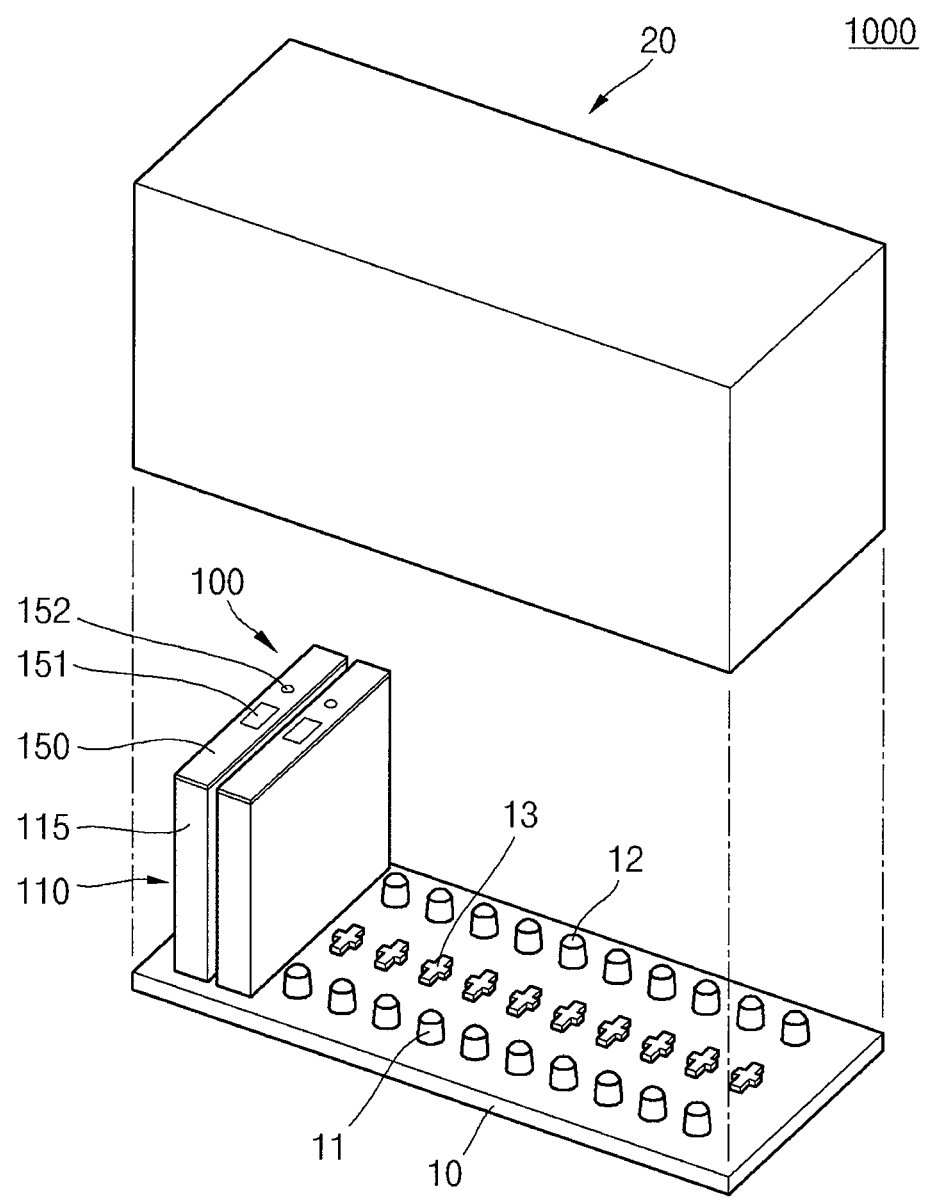
FIG. 5 is an exploded perspective view illustrating a battery pack including secondary batteries according to an embodiment of the present invention.

FIG. 5 is an exploded perspective view illustrating a battery pack including secondary batteries according to an embodiment of the present invention.

Referring to FIG. 5, the battery pack 1000 includes a plurality of secondary batteries 100 and pack cases 10 and 20 accommodating the plurality of secondary batteries 100. Since each of the secondary batteries 100 is the same as described above, the following description will focus on assembling of the secondary batteries 100 with the pack cases 10 and 20.

The pack cases 10 and 20 accommodate the secondary batteries 100 according to the embodiment of the present invention and protect the secondary batteries 100 from external impacts. In addition, the pack cases 10 and 20 electrically connect the plurality of secondary batteries 100 in series, in parallel or in series and parallel using wirings formed therein.

The pack cases 10 and 20 consist of a lower pack case 10 and an upper pack case 20. The lower pack case 10 includes coupling protrusions 11 and 12 formed on its top surface, the coupling protrusions 11 and 12 corresponding to coupling grooves 152 of the cap plate 150 of the secondary battery 100. The coupling protrusions 11 and 12 are inserted into the coupling grooves 112 of the case 110 of the secondary battery 100, thereby providing mechanical and electrical connection. In addition, the lower pack case 10 may further include auxiliary protrusions 13 formed roughly in the mid portion of the coupling protrusions 11 and 12 on a top surface of the lower pack case 10. The auxiliary protrusions 13 are engaged with the auxiliary grooves 114 of the secondary battery 100, thereby allowing the secondary battery 100 to be tightly engaged with the lower pack case 10 through accurate polarity. In this case, the secondary battery 100 maintains a coupling force between the coupling protrusions 11 and 12 and the auxiliary protrusions 13 due to its own weight. Thus, a separate pressing structure is not necessary during coupling.

In addition, since the lower pack case 10 includes a wiring formed therein, the secondary batteries 100 connected to the lower pack case 10 are connected to each other in series, in parallel or in series and parallel, thereby offering a desired output or capacity of the battery pack.

As described above, in the secondary battery 100 and the battery pack 1000 having the same, since the battery pack 1000 can be formed by engaging a coupling hole of a case to a coupling protrusion of a lower pack case, a separate structure, e.g., a bus bar, is not necessary, thereby minimizing the manufacturing cost of the battery pack 1000.

In addition, in manufacturing the battery pack 1000, the secondary battery 100 and the lower pack case 10 can be assembled to each other due to a weight of the secondary battery 100. Thus, since a separate welding process is not necessary and a separate pressing structure is not necessary, the manufacturing time can be shortened.

In addition, since the case 110 and the lower pack case 10 are assembled to each other due to the weight of the secondary battery 100, a separate pressing process is not necessary, thereby minimizing deformation of the assembled structure and minimizing a risk of electrolyte leakage and current leakage.

While this invention has been described in connection with what is presently considered to be practical exemplary embodiments, it is to be understood that the invention is not limited to the disclosed embodiments, but, rather is intended to cover various modifications and equivalent arrangements included within the spirit and scope of the appended claims.

What is claimed is:

1. A secondary battery comprising:
   a case having an opening;
   an electrode assembly housed in the case, the electrode assembly comprising first and second electrode plates and a separator coupled together;
   at least one current collector coupled to an uncoated portion of the electrode assembly and forming an electrode terminal, the at least one current collector comprising a first region spaced from the electrode assembly, a second region extending from the first region in a first direction and directly contacting one of the first and second electrode plates, and a third region extending from the first region in a second direction different from the first direction and spaced from the electrode assembly, wherein the case has a coupling groove recessed toward the at least one current collector; and a cap plate sealing the opening of the case.

2. The secondary battery of claim 1, wherein the at least one current collector comprises a plurality of current collectors, and wherein the case has a plurality of coupling grooves, each of the coupling grooves being recessed toward a respective one of the plurality of current collectors.

3. The secondary battery of claim 1, wherein the coupling groove of the case is generally aligned with a positive electrode current collector of the at least one current collector.

4. The secondary battery of claim 3, wherein the case contacts the positive electrode current collector via the coupling groove.

5. The secondary battery of claim 3, wherein the case is coupled to the positive electrode current collector by a weld.

6. The secondary battery of claim 1, wherein the coupling groove of the case is generally aligned with a negative electrode current collector of the at least one current collector.

7. The secondary battery of claim 6, wherein an insulation member is between the coupling groove of the case and an electrode terminal of the negative electrode current collector.

8. The secondary battery of claim 6, wherein a through-hole is formed in the coupling groove of the case through which the electrode terminal of the negative electrode current collector passes.

9. The secondary battery of claim 8, wherein the electrode terminal of the negative electrode current collector is engaged with a nut that is outside of the case.

10. The secondary battery of claim 9, further comprising an insulation member between the case and the nut.

11. The secondary battery of claim 1, wherein the case further includes at least one inwardly recessed auxiliary groove.

12. The secondary battery of claim 1, wherein the cap plate further includes a safety vent on a surface generally opposite to the opening, wherein the safety vent is thinner than a remainder of the case.

13. A battery pack comprising:

a plurality of secondary batteries each comprising a battery case having an opening, an electrode assembly housed in the case and forming an electrode terminal, the electrode assembly comprising first and second electrode plates and a separator coupled together, a pair of current collectors coupled to an uncoated portion of the electrode assembly, the at least one current collector comprising a first region spaced from the electrode assembly, a second region extending from the first region in a first direction and directly contacting one of the first and second electrode plates, and a third region extending from the first region in a second direction different from the first direction and spaced from the electrode assembly, and a cap plate sealing the opening of the battery case, wherein the case has a coupling groove that is inwardly recessed toward at least one of the pair of current collectors; and a pack case having a coupling protrusion generally corresponding to the coupling groove of each of the secondary batteries to be coupled to a respective one of the secondary batteries.

14. The battery pack of claim 13, wherein the coupling protrusion is electrically coupled to at least one of the pair of current collectors through the coupling groove of each of the secondary batteries.

15. The battery pack of claim 13, wherein each of the secondary batteries further includes at least one auxiliary groove in the battery case, and the pack case further includes an auxiliary protrusion generally corresponding to the auxiliary groove.

16. The battery pack of claim 13, wherein the pair of current collectors of each of the secondary batteries comprises a positive electrode current collector and a negative electrode current collector, and wherein the battery case is coupled to the positive electrode current collector by a weld.

17. The battery pack of claim 16, wherein the negative electrode current collector has an electrode terminal exposed outside of the case through an insulation member, and wherein a nut is engaged with the electrode terminal.

* * * * *